(12) United States Patent     (10) Patent No.:   US 12,643,489 B2

Inaba et al.     (45) Date of Patent:     Jun. 2, 2026

(54) VEHICLE DECORATIVE MEMBER

(71) Applicant: SUBARU CORPORATION, Tokyo (JP)

(72) Inventors: Koichi Inaba, Tokyo (JP); Hinako Tsukamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 246 days.

(21) Appl. No.: 18/593,107

(22) Filed: Mar. 1, 2024

(65) Prior Publication Data

US 2024/0317149 A1     Sep. 26, 2024

(30) Foreign Application Priority Data

Mar. 23, 2023    (JP) ................................. 2023-046938

(51) Int. Cl.
     B60R 13/02       (2006.01)
     G02B 27/00      (2006.01)

(52) U.S. Cl.
     CPC .......... B60R 13/02 (2013.01); G02B 27/0018 (2013.01)

(58) Field of Classification Search
     CPC ............................ B60R 13/02; G02B 27/0018
     USPC ..................................................... 428/542.2
     See application file for complete search history.

(56) References Cited

FOREIGN PATENT DOCUMENTS

JP      2009-090746 A     4/2009

OTHER PUBLICATIONS

Tracy, "Here's What Those Black Dots at the Edge of Your Windshield Actually Do", Jalopnik, Feb. 3, 2017, URL: <https://www.jalopnik.com/heres-what-those-little-dots-are-on-the-edges-of-your-c-1791075995/>, pp. 1-14 (Year: 2017).*

AD, "Blindzone Glare Elimination Mirror Method", Jul. 20, 2021, URL: <http://web.archive.org/web/20210720050103/https://www.nhtsa.gov/sites/nhtsa.gov/files/blindzoneglaremirrormethod.pdf>, pp. 1-2 (Year: 2021).*

* cited by examiner

*Primary Examiner* — Katherine A Christy

(74) *Attorney, Agent, or Firm* — Smith, Gambrell & Russell LLP

(57)          ABSTRACT

A vehicle decorative member is disposed in a vehicle interior of a vehicle. The vehicle decorative member is located between an occupant and each of a transparent member and a visual check member. The vehicle decorative member includes a decorative surface. The decorative surface faces the vehicle interior. The decorative surface is formed such that a reflectance of the decorative surface is reduced from a side where the occupant is located toward a side where the visual check member is located.

8 Claims, 5 Drawing Sheets

10

16

18

11

111

132

14

17,
171

121, 122

15

10

121, 122

22

132  134

UP

FRONT ←→ REAR

DOWN

VEHICLE DECORATIVE MEMBER

CROSS-REFERENCE TO RELATED APPLICATIONS

The present application claims priority from Japanese Patent Application No. 2023-046938 filed on Mar. 23, 2023, the entire contents of which are hereby incorporated by reference.

BACKGROUND

The disclosure relates to a vehicle decorative member disposed in a vehicle interior of a vehicle.

It has been known that a ghost phenomenon is produced in a vehicle. The ghost phenomenon is a phenomenon in which light emitted from a light source such as sunlight is reflected by a vehicle interior component and the reflected light is reflected in glass so as to be a ghost. The production of a ghost phenomenon may obstruct occupant's view through glass.

The following measures against such a ghost phenomenon have been considered and employed. For example, vehicle interior components are colored such that light reflected thereby is unobtrusive. In addition, the gloss of a surface of each of vehicle interior components is reduced so as to reduce the reflectance thereof. In addition, the angle of a surface of each of vehicle interior components is adjusted. In addition, the number of surfaces of each of vehicle interior components is increased.

A disclosure relating to vehicle interior components is described in Japanese Unexamined Patent Application Publication (JP-A) No. 2009-90746.

SUMMARY

An aspect of the disclosure provides a vehicle decorative member disposed in a vehicle interior of a vehicle. The vehicle decorative member is located between an occupant and each of a transparent member and a visual check member. The vehicle decorative member includes a decorative surface. The decorative surface faces the vehicle interior. The decorative surface is formed such that a reflectance of the decorative surface is reduced from a side of the occupant toward a side of the visual check member.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

There is room for improvement in measures against a ghost phenomenon according to JP-A No. 2009-90746.

For example, measures in which the color, shape, and the like of a surface of each of vehicle interior components are changed have a problem in that the degree of freedom in the design of each of the vehicle interior components is reduced to reduce the power to appeal to consumers of a vehicle from the viewpoint of design. In addition, such measures have a problem causing an increase in cost and weight.

In addition, when an occupant checks a side mirror, the occupant visually checks the side mirror through a side glass. Accordingly, when a ghost phenomenon is produced in the side glass, it can be considered that the ghost phenomenon reduces the visibility of the side mirror and affects safety during running of a vehicle.

It is desirable to provide a vehicle decorative member capable of reducing the effect of a ghost phenomenon on a visual check member such as a side mirror.

The accompanying drawings are included to provide a further understanding of the disclosure and are incorporated in and constitute a part of this specification. The drawings illustrate embodiments and, together with the specification, serve to describe the principles of the disclosure.

A vehicle decorative member 11 and a vehicle 10 according to the embodiment of the disclosure will be described in detail below with reference to the drawings. A front-rear direction, an up-down direction, and a left-right direction are used in the following description. The left and right herein are the left and right when the vehicle 10 is viewed from the rear side. In addition, in the following description, in principle, the same components have the same reference signs, and redundant descriptions thereof are omitted.

Figure 1:
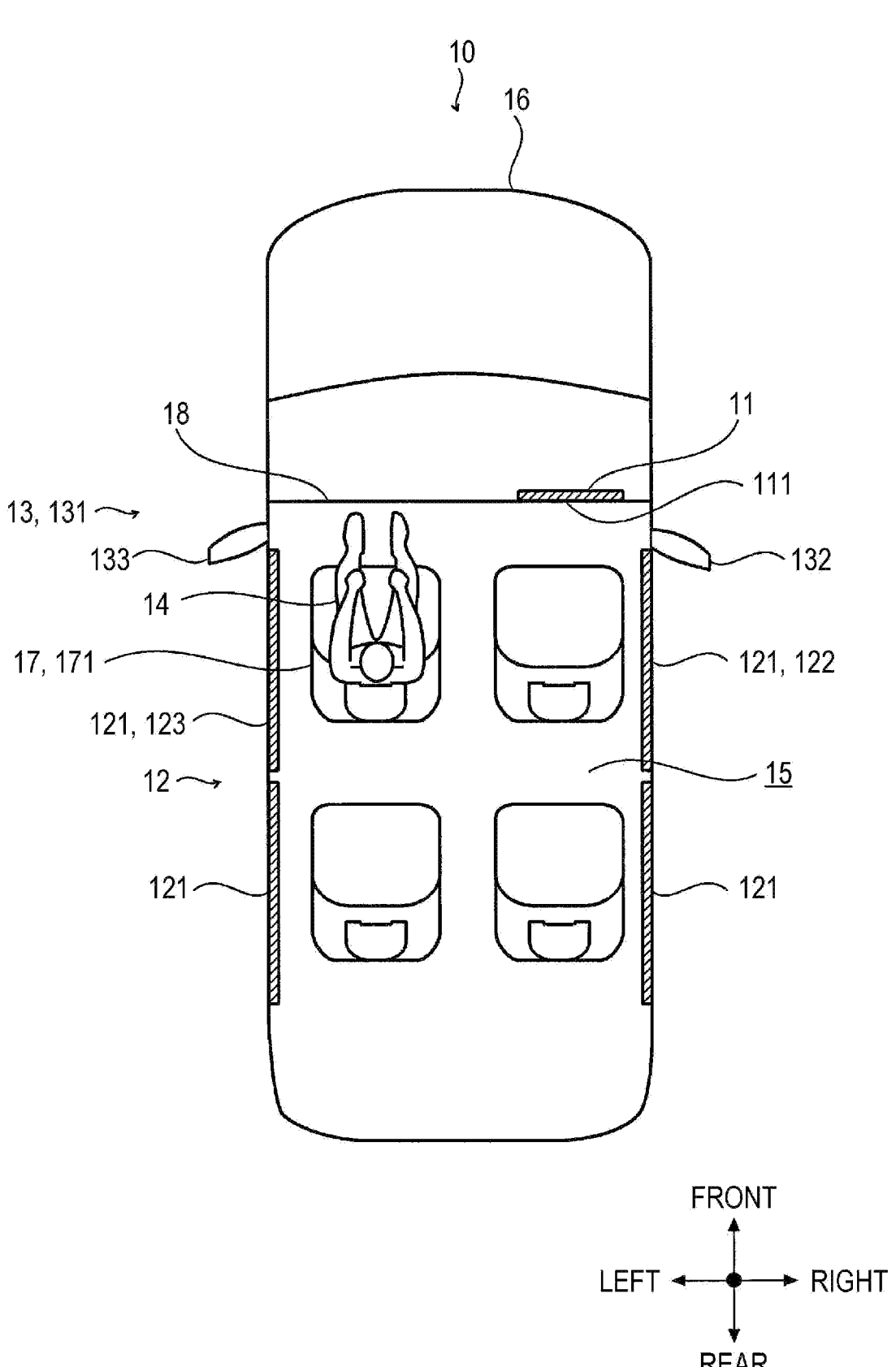
FIG. 1 is a top view illustrating a vehicle including a vehicle decorative member according to an embodiment of the disclosure.

FIG. 1 is a top view illustrating the vehicle 10 including the vehicle decorative member 11.

The vehicle 10 is, for example, a passenger car and includes a vehicle body 16. The vehicle body 16 includes a vehicle interior 15, in which seats 17 are disposed. Here, a front left seat 171 is a driver's seat in which an occupant 14, who is a driver who drives the vehicle 10, sits. For example, a steering wheel, which serves as a steering member, an accelerator pedal, which serves as an accelerating member, and a brake pedal, which serves as a braking member, are disposed on the front side of the front left seat 171. That is, the vehicle 10 is a left-hand drive vehicle in which, for example, a steering handle is disposed on the left side of the vehicle body 16.

Side glasses 121, which serve as transparent members 12, are disposed on the respective sides of the vehicle body 16. For example, the side glasses 121 are disposed in a front part and a rear part of the left side of the vehicle body 16 and a front part and a rear part of the right side of the vehicle body 16.

Visual check members 13 are devices via which the occupant 14 visually checks the rear side of the vehicle 10. The visual check members 13 are, for example, side mirrors 131. The side mirrors 131 include a right side mirror 132 and a left side mirror 133.

The right side mirror 132 is attached to the vicinity of the front end of a front right door. The occupant 14 can visually check the rear right side of the vehicle body 16 via the right side mirror 132. In this case, the occupant 14 visually checks the right side mirror 132 through a front right side glass 122.

The left side mirror 133 is attached to the vicinity of the front end of a front left door. The occupant 14 can visually check the rear left side of the vehicle body 16 via the left side mirror 133. In this case, the occupant 14 visually checks the left side mirror 133 through a front left side glass 123.

The vehicle decorative member 11 is a member that is disposed in the vehicle interior 15 of the vehicle 10 and that is located between the occupant 14 and each of the front right side glass 122 and the right side mirror 132. The vehicle decorative member 11 is disposed on the right side of a surface, facing the rear side, of a dashboard 18. In addition, the vehicle decorative member 11 has a decorative surface 111, which faces the vehicle interior 15. The configuration of the decorative surface 111 will be described later with reference to, for example, FIG. 3.

In the embodiment, the occupant 14, the decorative surface 111, the front right side glass 122, and the right side mirror 132 are disposed in this order from the left side in the width direction of the vehicle 10. Accordingly, the occupant 14 visually checks the right side mirror 132 through the front right side glass 122. In this case, the decorative surface 111 is reflected in the front right side glass 122. However, in the embodiment, the decorative surface 111 is reflected in a predetermined manner, thus reducing a ghost phenomenon. Such a subject will be described later with reference to, for example, FIG. 5.

Figure 2:
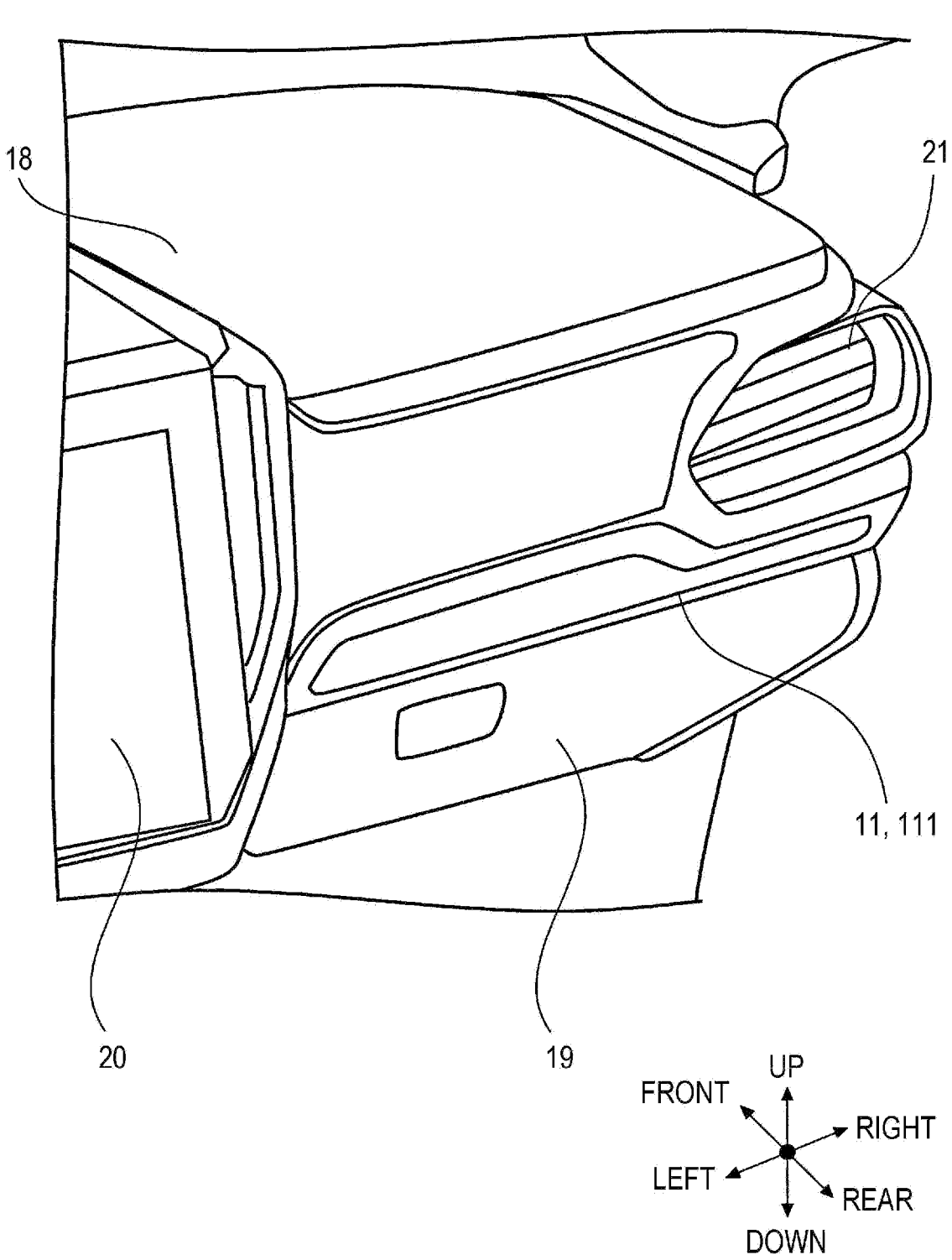
FIG. 2 is a perspective view illustrating the vehicle decorative member according to the embodiment of the disclosure and the vicinity of the vehicle decorative member.

FIG. 2 is a perspective view illustrating the vehicle decorative member 11 and the vicinity of the vehicle decorative member 11. A center display 20, which serves as, for example, a navigation window, is disposed at the center of a rear surface of the dashboard 18. A conditioned air outlet 21, through which conditioned air blows out, is disposed at the right end of the rear surface of the dashboard 18. A glove compartment 19 is disposed in a lower part of the dashboard 18.

The vehicle decorative member 11 is a resin molded product including a longitudinal part extending in the left-right direction in a lower part of the rear surface of the dashboard 18. For example, the vehicle decorative member 11 is produced by insert molding a plate-like member forming the decorative surface 111. When the occupant 14 visually checks the right side mirror 132, the vehicle decorative member 11 forms an image in the front right side glass 122 due to the shape and the position of the vehicle decorative member 11. In the embodiment, the decorative surface 111 of the vehicle decorative member 11 is formed to reduce the adverse effect on the visibility of the right side mirror 132 when the occupant 14 visually checks the right side mirror 132. Such a subject will be described later with reference to FIG. 3.

Figure 3:
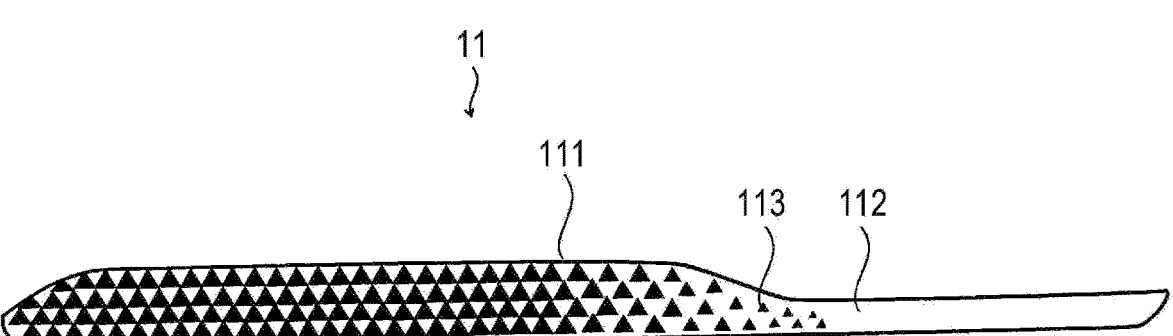
FIG. 3 is a rear view illustrating the vehicle decorative member according to the embodiment of the disclosure.
Figure 3:
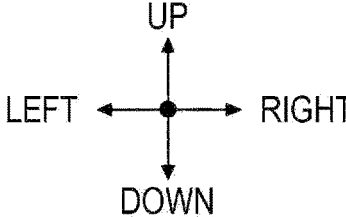

FIG. 3 is a rear view illustrating the vehicle decorative member 11.

As described above, the vehicle decorative member 11 has the decorative surface 111, which is a main surface facing the rear side.

The decorative surface 111 is formed such that the reflectance thereof is reduced from the left side, which is the side where the occupant 14 is located, toward the right side, which is the side where the right side mirror 132 is located.

As an embodiment, the decorative surface 111 is subjected to gradation processing in which the reflectance thereof is gradually reduced toward the right side. For example, the decorative surface 111 is subjected to gradation processing so as to include a first part 112 and a second part 113. The first part 112 has a color whose reflectance is low, such as black. The second part 113 is has a color whose reflectance is higher than that of the first part 112, such as gold or orange. In the decorative surface 111, the area that the second part 113 occupies is reduced per unit area from the left side, which is the side where the occupant 14 is located, toward the right side, which is the side where the right side mirror 132 is located. Accordingly, the second part 113 is densely disposed in a left part of the decorative surface 111, and the left part of the decorative surface 111 thus has a high reflectance and can make the decorative surface 111 sumptuous. On the other hand, the second part 113 are sparsely disposed in a right part of the decorative surface 111, and the right part of the decorative surface 111 thus has a low reflectance. Thus, as described below, even when the right part of the decorative surface 111 is reflected in the front right side glass 122, the right part of the decorative surface 111 has a low reflectance, thus enabling inhibition of occurrence of a ghost phenomenon.

Here, in an embodiment of the decorative surface 111, it is possible to adopt a color gradation. In this case, the left part of the decorative surface 111 has a color whose reflectance is high, such as a white-based color. On the other hand, the right part of the decorative surface 111 has a color whose reflectance is lower than that of the left part, such as a black-based color. Even such a configuration is capable of achieving an effect similar to that of the embodiment described above.

In addition, in an embodiment of the decorative surface 111, it is possible to adopt a surface shape gradation. For example, the left part of the decorative surface 111 has a surface shape whose reflectance is high, such as an uneven shape whose amount of projection is large. On the other hand, the right part of the decorative surface 111 has a shape whose reflectance is low, such as an uneven shape whose amount of projection is smaller than that of the left part. Even such a configuration is capable of achieving an effect similar to that of the embodiment described above.

Figure 4:
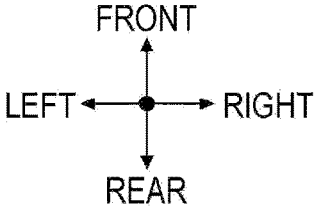
FIG. 4 is a top view illustrating a part of the vehicle including the vehicle decorative member according to the embodiment of the disclosure.

FIG. 4 is a top view illustrating a part of the vehicle 10 including the vehicle decorative member 11 and illustrates a situation in which the occupant 14 visually checks the right side mirror 132.

When the occupant 14, who is a driver who drives the vehicle 10, checks the rear right side of the vehicle 10, the occupant 14 visually checks the right side mirror 132 through the front right side glass 122. The occupant 14's line of sight in this case is represented by a broken line. On the other hand, sunlight is radiated into the vehicle interior 15, and the decorative surface 111 is thus reflected in an inner surface of the front right side glass 122 to form an image. Accordingly, the image of the decorative surface 111 and the occupant 14's line of sight overlap each other in the front right side glass 122. In the embodiment, as described above, even in such a case, a reduction in the reflectance of the right part of the decorative surface 111 achieves sufficient visibility of the right side mirror 132 when the occupant 14 visually checks the right side mirror 132.

Figure 5:
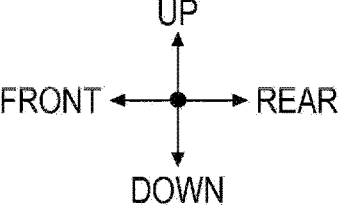
FIG. 5 is a diagram illustrating a situation in which the vehicle decorative member according to the embodiment of the disclosure is reflected in a front right side glass.

FIG. 5 is a diagram illustrating a situation in which the vehicle decorative member 11 is reflected in the front right side glass 122 in the occupant 14's field of view.

When the occupant 14 visually checks the right side mirror 132, the occupant 14 views a reflection surface 134, which is disposed on the right side mirror 132. In addition, the occupant 14 sits inside the vehicle 10, whereas the reflection surface 134 is disposed outside the vehicle 10. Accordingly, the occupant 14 visually checks the reflection surface 134 through the front right side glass 122.

As described above, an image 22 of the decorative surface 111 is formed in the inner surface of the front right side glass 122. In addition, the reflection surface 134 and a lower part of the image 22 overlap each other. Here, the lower part of the image 22 is formed by the right part of the decorative surface 111 illustrated in FIG. 3. As described above, the right part of the decorative surface 111 is formed so as to have a low reflectance.

Accordingly, the part of the image 22 overlapping the reflection surface 134 has a low reflectance. Thus, the image 22 does not reduce the visibility of the reflection surface 134 when the occupant 14 visually checks the reflection surface 134. As a result, the occupant 14 can safely drive the vehicle 10 by sufficiently visually checking the rear right side of the vehicle 10 via the reflection surface 134.

The technical idea understandable from the embodiment described above will be described below with the effects thereof.

The vehicle decorative member according to the embodiment of the disclosure is a vehicle decorative member that is disposed in the vehicle interior of the vehicle and that is located between the occupant and each of the transparent member and the visual check member. The vehicle decorative member has the decorative surface facing the vehicle interior. The decorative surface is formed such that the reflectance thereof is reduced from the side where the occupant is located toward the side where the visual check member is located. The vehicle decorative member according to the embodiment of the disclosure is capable of achieving sufficient visibility of the visual check member through the transparent member when the vehicle decorative member is reflected in the transparent member. In addition, the vehicle decorative member according to the embodiment of the disclosure is capable of achieving a sufficient degree of freedom in the design of the decorative surface. In addition, even when gloss is adopted to the decorative surface, there are no problems as long as the gloss is reduced toward the side where the visual check member is located. In addition, since the surface configuration of the decorative surface simply varies, the component is not divided, and the shape is not changed. Thus, there is no increase in cost and weight.

In addition, in the vehicle decorative member according to the embodiment of the disclosure, the occupant, the decorative surface, the transparent member, and the visual check member are disposed in this order in the width direction of the vehicle. The occupant visually checks the visual check member through the transparent member. The vehicle decorative member according to the embodiment of the disclosure enables the visual check member to be clearly visually checked. For example, when the occupant visually checks the visual check member, the occupant visually checks the visual check member through the transparent member. Accordingly, the occupant also visually checks the visual check member through the part of the transparent member in which the decorative surface is reflected. In this case, since the part of the decorative surface close to the visual check member has a low reflectance, the reflection of the decorative surface does not reduce the visibility when the occupant visually checks the visual check member.

In addition, in the vehicle decorative member according to the embodiment of the disclosure, the decorative surface is subjected to gradation processing so as to include the first part and the second part whose reflectance is higher than that of the first part. In the decorative surface, the area that the second part occupies is reduced per unit area from the side where the occupant is located toward the side where the visual check member is located. The vehicle decorative member according to the embodiment of the disclosure is capable of achieving a certain level or more of the visibility of the visual check member due to less reflection of the second part in the transparent member.

In addition, in the vehicle decorative member according to the embodiment of the disclosure, the transparent member is a side glass, and the visual check member is a side mirror. The vehicle decorative member according to the embodiment of the disclosure enables the side mirror to be clearly visually checked through the side glass even when the decorative surface is provided in the vehicle interior.

In addition, in the vehicle decorative member according to the embodiment of the disclosure, the occupant sits in a seat on one of the left side and the right side, the transparent member is a side glass disposed on the other of the left side and the right side, and the visual check member is a side mirror disposed on the other of the left side and the right side. The vehicle decorative member according to the embodiment of the disclosure enables the occupant to clearly visually check, through the side glass, the side mirror located opposite to the occupant in the left-right direction even when the decorative surface is located in the vehicle interior.

The embodiments of the disclosure have been described above, but the disclosure is not limited thereto. The embodiments can be modified without departing from the gist of the disclosure. In addition, the embodiments described above can be combined with each other.

When referring to FIG. 1, in the embodiment described above, the occupant 14, who is a driver who drives the vehicle 10, the decorative surface 111, the front right side glass 122, and the right side mirror 132 are disposed in this order from the left side. However, this order can be reversed. For example, the occupant 14, who is a driver who drives the vehicle 10, the decorative surface 111, the front left side glass 123, and the left side mirror 133 may be disposed in this order from the right side. That is, the configuration of the embodiment is applicable to a right-hand drive vehicle.

The invention claimed is:

1. A vehicle decorative member disposed in a vehicle interior of a vehicle, the vehicle decorative member being located between a driver's seat and each of a transparent member and a visual check member, the vehicle decorative member comprising:

a decorative surface disposed on a vehicle dashboard in the vehicle interior and facing the vehicle interior, the decorative surface being formed such that a reflectance of the decorative surface is reduced from a side of the driver's seat toward a side where the visual check member is located.

2. The vehicle decorative member according to claim 1, wherein the driver's seat, the decorative surface, the transparent member, and the visual check member are disposed in this order in a width direction of the vehicle, and the visual check member is positioned external to the transparent member as to be viewable through the transparent member from the interior of the vehicle.

3. The vehicle decorative member according to claim 1, wherein the decorative surface comprises a first part and a second part that are formed by being subjected to gradation processing, the second part having a reflectance higher than a reflectance of the first part, and in the decorative surface, an area that the second part occupies is reduced per unit area from the side where the driver's seat is located toward the side where the visual check member is located.

4. The vehicle decorative member according to claim 1, wherein the transparent member is a side glass, and the visual check member is a side mirror.

5. The vehicle decorative member according to claim 1, wherein the driver's seat coincides with a vehicle seat on either a left side or a right side in the vehicle interior, the transparent member is a side glass disposed on the opposite side, and the visual check member is a side mirror disposed on the opposite side.

6. The vehicle decorative member according to claim 1, wherein the decorative surface comprises a first part and a second part that are formed by being subjected to gradation processing, the second part having a reflectance higher than a reflectance of the first part, and the first part being located closer to the visual check member than is the second part.

7. The vehicle decorative member according to claim 6, wherein a color of the first part is black and a color of the second part is gold or orange.

8. The vehicle decorative member according to claim 6, wherein an area that the second part occupies is reduced in unit area in a direction toward the first part.

\* \* \* \* \*